United States Patent [19]

Debelius

[11] Patent Number: 4,474,077

[45] Date of Patent: Oct. 2, 1984

[54] HOUSING RETAINING MEANS FOR PORTABLE POWER TOOLS AND METHOD OF ASSEMBLY THEREFOR

[75] Inventor: Stephen A. Debelius, Millers, Md.

[73] Assignee: Black & Decker Inc., Newark, Del.

[21] Appl. No.: 344,625

[22] Filed: Feb. 1, 1982

[51] Int. Cl.³ .................. F16H 57/02; B23Q 5/027; B25B 25/00; B23P 19/00

[52] U.S. Cl. .................. 74/606 R; 173/145; 74/417; 81/57.11; 29/526 R; 29/451; 403/326; 220/319

[58] Field of Search ............ 74/606 R, 416, 417, 74/606 A; 173/145, 164, 163; 81/57.11, 57.12, 57.13, 57.14; 308/189 R; 464/170, 173; 403/326; 29/526 R, 596, 451; 220/319, 328, 327

[56] References Cited

U.S. PATENT DOCUMENTS

| | | | |
|---|---|---|---|
| 1,411,422 | 4/1922 | Leece | 310/89 |
| 2,260,712 | 10/1941 | Harrison | 220/319 X |
| 2,506,767 | 5/1950 | Bennett | 74/417 |
| 2,631,551 | 3/1954 | Lawrence et al. | 464/170 X |
| 2,678,192 | 5/1954 | Ledbetter | 74/417 |
| 2,826,095 | 3/1958 | Dirzius | 74/606 R |
| 2,899,850 | 8/1959 | Selby et al. | 74/606 |
| 2,976,436 | 3/1961 | Anton | 173/163 |
| 3,208,722 | 9/1965 | Rodriquez et al. | 173/163 |
| 3,357,275 | 12/1967 | Green, Jr. et al. | 74/606 R |
| 3,593,878 | 7/1971 | Hertell | 220/328 |
| 4,011,774 | 3/1977 | Moosberg | 74/606 R |
| 4,331,175 | 5/1982 | Brake et al. | 220/319 X |
| 4,424,004 | 1/1984 | Hiskes | 220/328 X |

Primary Examiner—Allan D. Herrmann
Assistant Examiner—Stephen B. Andrews
Attorney, Agent, or Firm—Ronald B. Sherer; Harold Weinstein; Charles E. Yocum

[57] ABSTRACT

A molded-plastic retaining member is mounted within the gear case or other internal housing member of a power tool and is keyed thereto. Screws pass through openings in the gear case cover and are received axially in respective bosses formed within the retaining member, thereby securing the gear case cover to the gear case. The gear case cover is formed with an internal hub, and locating ribs on the retaining member radially engage the hub to prevent the retaining member from disengaging the gear case, as the gear case cover is secured to the retaining member. Preferably, the retaining member comprises a partially-formed resilient ring which is molded from a suitable plastic material and is deformable during the assembly operation. Additionally, the internal hub on the gear case cover is provided with a bearing boss, and a bearing is mounted therein for journaling the rear portion of the output spindle. The assembly of the gear case and the gear case cover, and the components therein, are thereafter enclosed by a "clam-shell" outer housing.

16 Claims, 12 Drawing Figures

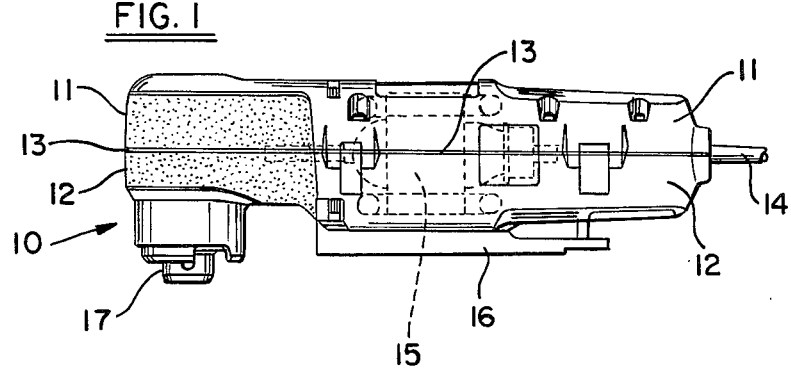
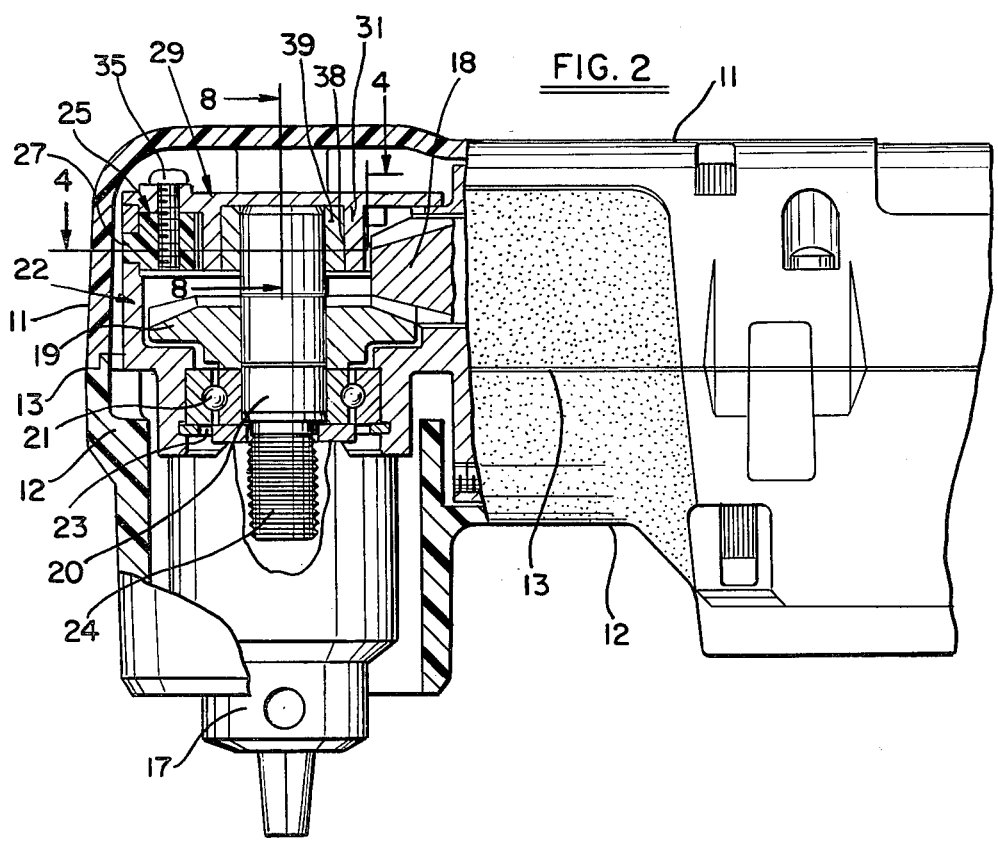

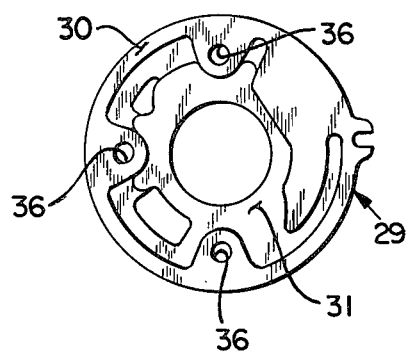
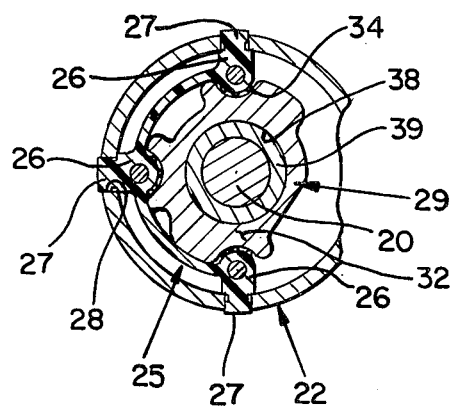
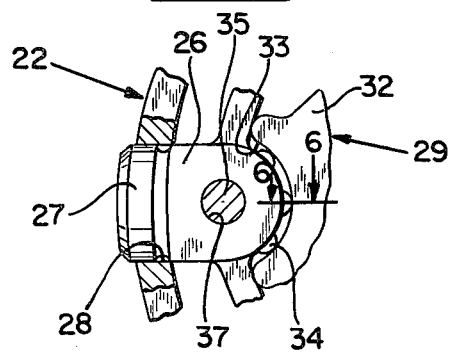
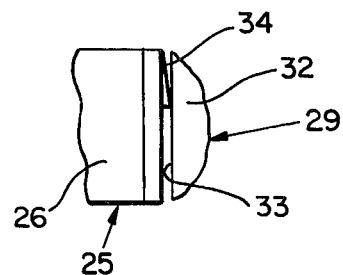
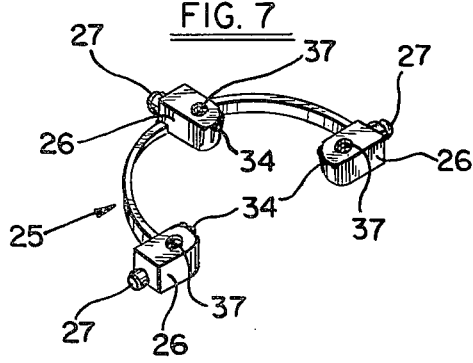
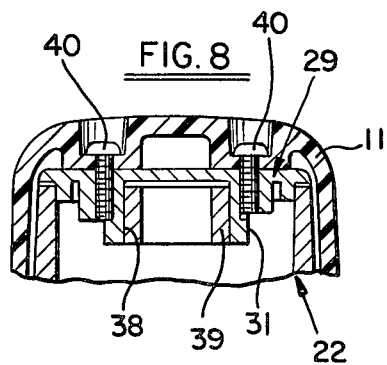

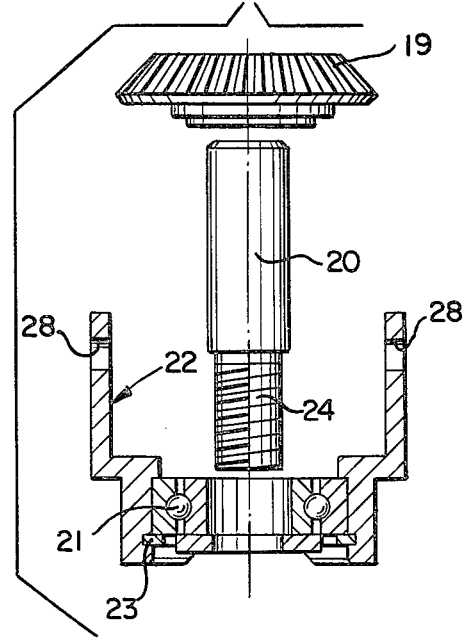
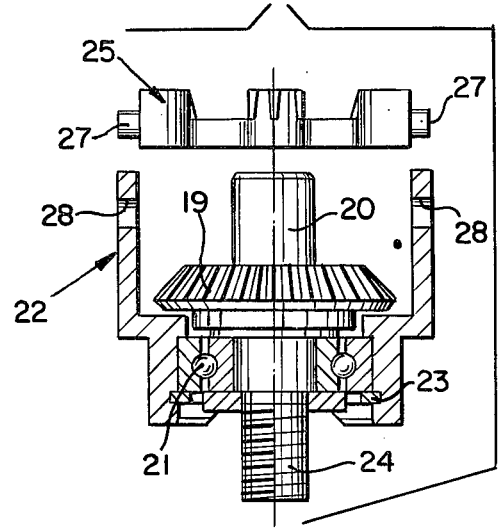
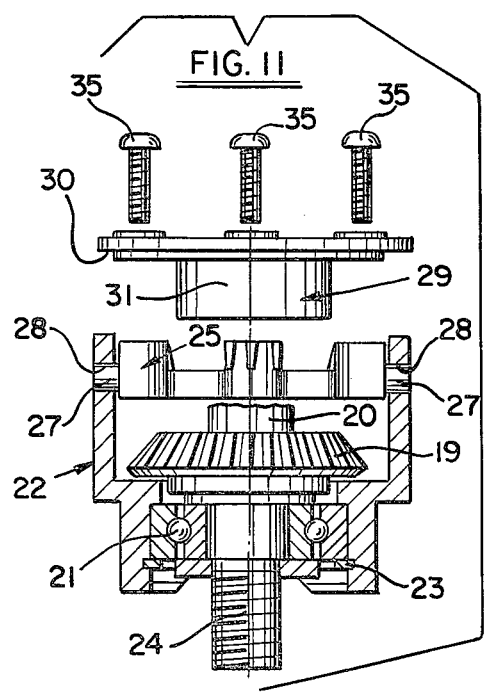
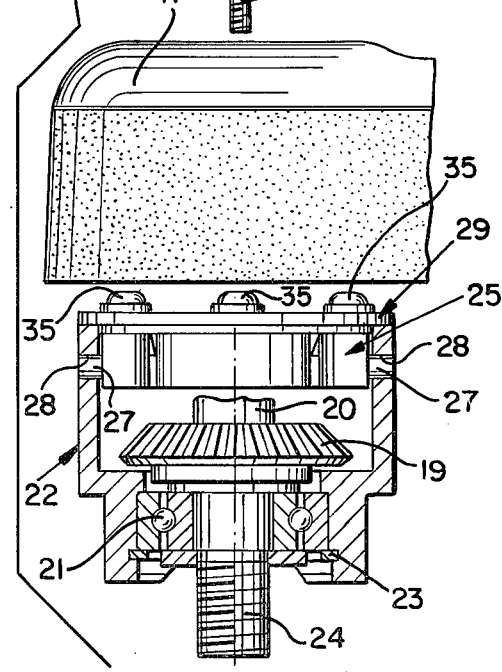

HOUSING RETAINING MEANS FOR PORTABLE POWER TOOLS AND METHOD OF ASSEMBLY THEREFOR

BACKGROUND OF THE INVENTION

Portable electric tools generally have a motor housing, a gear case, and a gear case cover therebetween. These housings are axially disposed relative to one another, or else are provided in an overall "clam shell" housing, the latter including a pair of complementary mating halves joined together along a common longitudinal plane. Moreover, in certain types of power tools, such as in a right-angle drill, the gear case includes a portion disposed transversely of the motor axis. The top of this transverse portion is closed by an overhead wall, formed integrally with the gear case; or in the case of clam-shell housings, integrally with the top housing member. This top housing member serves as a cover and is secured to the bottom housing member by means of screws. The screws, which may be self-tapping, pass through openings in the top housing member and are received in respective bosses within the bottom housing member. This structural arrangement requires cast-in bosses in the transverse gear case portion of the bottom housing member. These bosses tend to interfere with the assembly of the output spindle and bevel gear within the gear case; and as result, the diameter and height of the gear case must be increased to allow these components to clear the bosses during their assembly within the gear case. Thus the overall tool is somewhat larger, which detracts from its portability and convenience of operation; and besides, manufacturing costs are increased.

SUMMARY OF THE INVENTION

Accordingly, it is an object of the present invention to eliminate the cast-in bosses in the gear case of a portable power tool, especially one having a right-angularly disposed output spindle.

It is another object of the present invention to provide a retaining member mounted within the gear case and keyed thereto, the retaining member cooperating with fastening means passing through the gear case cover, thereby securing the gear case cover to the gear case.

It is yet another object of the present invention to provide a retaining ring having a plurality of bosses formed integrally thereon for receiving respective fastening means, the bosses having keying means engaging the gear case, and the bosses further having locating means cooperating with the gear case cover to prevent the disengagement of the keying means as the fastening means are received in the respective bosses.

It is a further object of the present invention to provide a retaining ring that may be economically molded from a suitable plastic material.

It is a still further object of the present invention to provide an improved method of assembly of a portion of the components of a power tool or the like.

It is yet still a further object of the present invention to provide, in a power tool, an improved method of assembly of the components within the gear case of the power tool, wherein a resilient retaining member is positioned within the gear case and is subsequently deformed therein.

In accordance with the broad teachings of the present invention, a deformable retaining member is inserted within the housing member of a power tool and is positioned therein, and means subsequently engages the retaining member and causes the retaining member to deform to substantially assume at least a portion of the internal configuration of the housing member.

In accordance with the specific teachings of the present invention, a retaining ring has a plurality of circumferentially-spaced bosses formed integrally thereon. Pins project radially from the respective bosses and are received in respective openings formed in the cylindrical wall of the gear case, thereby mounting the retaining ring within the gear case and keying it thereto. Screws pass through the gear case cover and are received in the respective bosses of the retaining ring, thereby securing the gear case cover to the gear case.

In accordance with the still further teachings of the present invention, locating ribs on the respective bosses engage an internal hub on the gear case cover to prevent the pins from pulling out of the respective openings, as the gear case cover is secured to the gear case. The internal hub has a sleeve bearing for journaling the rearward portion of the output spindle. A clam-shell molded plastic housing encloses the gear case and gear cover; and the top housing member has a portion thereof secured to the gear case cover, thereby providing additional structural rigidity.

These and other objects of the present invention will become apparent from a reading of the following description, taken in conjunction with the enclosed drawings.

BRIEF DESCRIPTION OF THE DRAWINGS

FIG. 1 is a side elevation of one type of portable power tool incorporating the teachings of the present invention;

FIG. 2 is a portion of FIG. 1, drawn to an enlarged scale and with parts broken away and sectioned, showing the gear case cover secured to the internal gear case;

FIG. 3 is a bottom plan view of the gear case cover;

FIG. 4 is a section view, taken along the lines 4—4 of FIG. 2, showing the retaining ring keyed to the gear case and receiving the screws passing through the gear case cover;

FIG. 5 is an enlarged portion of FIG. 4, showing the locating ribs between the bosses on the retaining ring and the internal hub on the gear case cover;

FIG. 6 is a section view, taken along the lines 6—6 of FIG. 5, showing one of the locating ribs;

FIG. 7 is an isometric view of the molded-plastic retaining ring;

FIG. 8 is a section view, taken along the lines 8—8 of FIG. 2, and showing the assembly of the top clam-shell housing member to the gear case cover; and FIGS. 9–12 are respective sequence views, somewhat schematic and with parts being broken away and sectioned, showing the method of assembly of the major components of the present invention.

DESCRIPTION OF THE PREFERRED EMBODIMENT

With reference to FIG. 1, there is illustrated a right-angle portable electric drill 10 with which the teachings of the present invention may find more particular utility. However, it will be appreciated by those skiled in the art that the teachings of the present invention are not necessarily restricted to the drill 10, but rather are equally applicable to a wide variety of power tools.

With this in mind, the drill 10 generally comprises a "clam-shell" housing including a pair of complementary mating halves 11 and 12 joined together along a common horizontal midplane 13, an electric line cord 14, an electric motor 15 within the housing (shown in broken lines), a "paddle" or lever switch 16 for controlling the energization of the tool, and a chuck 17 disposed at right angles to the longitudinal axis of the tool. The motor is mechanically connected to drive bevel pinion 18, shown partially in FIG. 2. The particular mechanical connection between the motor and bevel pinion is considered conventional and forms no part of the present invention.

With further reference to FIG. 2, the bevel pinion 18 meshes with a bevel spindle gear 19. The spindle gear is carried by an output spindle 20 journaled in a bearing 21. The bearing is retained within a right-angularly disposed portion of the gear case 22 by means of a snap ring 23. The chuck is threaded on the end of the output spindle, as at 24.

With reference to FIGS. 3–7, a molded-plastic retaining member 25, shown in isometric view in FIG. 7, has a plurality (preferably three) of circumferentially-spaced enlarged bosses 26 formed thereon. Each of the bosses has a radially-projecting pin 27. The pins are received in respective openings 28 formed in the cylindrical wall of the gear case, thereby mounting the retaining member within the gear case and keying it thereto. Preferably, but not necessarily, the retaining member is in the form of a semi-circular or partially-formed ring. However, it will be appreciated by those skilled in the art that the retaining member could be a continuous ring or any configuration which substantially conforms to the internal configuration of the gear case or other internal housing member of the power tool.

A gear case cover 29 (preferably of generally cylindrical configuration) is secured to the gear case. The bottom of the gear case cover has a plurality of arcuate ridges 30, disposed circumferentially between the respective bosses on the retaining member, for seating the gear case cover on top of the gear case. The gear case cover further has an internal hub 31 having a plurality of radially-extending portions 32 which terminate outwardly in arcuate recesses 33. These recesses, as shown more clearly in FIGS. 5 and 6, cooperate with tapered longitudinally-extending locating ribs 34 formed integrally with the respective bosses on the retaining member. As a result, the retaining member is positioned axially as well as radially between the gear case and gear case cover. The radial positioning of the retaining member comprises, first, the pins on the retaining member which are received in the openings in the wall of the gear case, and second, the locating ribs on the retaining member which engage the internal hub on the gear case cover. Fastening means, such as self-tapping screws 35, pass through respective holes 36 in the gear case cover (in direction parallel to the axis of the generally cylindrical wall of the right-angularly disposed gear case) and are received in respective openings 37 formed in the bosses in the retaining member.

As the screws are received in the bosses on the retaining member, the wall of the gear case is retained axially between the gear case cover and the retaining member. Moreover, the locating ribs (which engage the hub on the gear case cover) prevent the pins from pulling out of the respective openings in the wall of the gear case during assembly of the gear case cover to the retaining member (and hence to the gear case).

With this arrangement, the requirement for cast-in internal bosses in the gear case is eliminated. As a result, the diameter and height of the gear case are both minimized, since basically the limiting dimension is the diameter of the bevel spindle gear. This provides a very compact overall assembly. Moreover, the internal hub of the gear case cover provides a bearing boss 38, and a sleeve bearing 39 is press-fitted therein for journaling the rear portion of the output spindle.

With reference to FIG. 8, a portion of the top housing member is secured to the gear case cover by self-tapping screws 40, thereby providing additional rigidity between the housing members.

The gear case and gear case cover are preferably die-cast from a suitable material, such as aluminum, and thus constitute internal metal frame members for the tool. The subassembly of the gear case and gear case cover are enclosed by the clam-shell housing members 11 and 12, which preferably are molded from a suitable plastic material. This overall arrangement provides a compact reliable relatively low-cost power tool having the desirable features of double-insulation, attractiveness, and convenience of operation.

With reference to FIGS. 9–12, the method of assembly of the components of the present invention, and the inherent advantages thereof, will become apparent. The bevel spindle gear 19 is suitably mounted on the output spindle 20 to form a subassembly, and the spindle is journaled in the ball bearing 21 in the gear case 22 (as shown in FIGS. 9 and 10). The retaining member 25 is then mounted within the gear case, such that the pins 27 on the bosses 26 of the retaining member 25 are received in the respective openings 28 in the cylindrical wall of the gear case (as shown in FIG. 11). Since the retaining member is molded from a resilient plastic material, it may be flexed sufficiently to be snapped in place within the gear case. The gear case cover 29 is then positioned on top of the gear case, with the rear portion of the output spindle being journaled in the sleeve bearing 39, and with the locating ribs 34 on the bosses of the retaining member engaging the hub 31 on the gear case cover (as shown in FIGS. 5 and 6). The screws 35 are then received through the gear case cover and are driven into the respective openings 37 formed in the bosses on the retaining member, as shown in FIG. 12, thereby securing the gear case cover to the retaining member and hence to the gear case. The forward portion of the top housing member 11 (shown in FIG. 12) is then secured to the gear case cover (as shown in FIG. 8).

Since the retaining member (or ring) is molded from a resilient material, it is deformed (during assembly of the fastening means thereto) so as to expand radially and substantially assume at least a portion of the internal configuration of the gear case or other internal housing member of the tool.

Thus, not only are the size and weight of the gear case and gear case cover minimized; but moreover, the assembly of the components within the gear case, and the assembly of the gear case cover to the gear case, are facilitated. This is a direct result of the deformable resilient retaining member, positioned above the spindle gear (or other tool component), such that the external diameter or outer configuration of the resilient retaining member conforms to, and closely approaches, the internal configuration of the gear case (or other housing member). As a result, the costs of housings and assembly time are reduced, as are the size and weight of the overall tool, thereby enhancing its portability and convenience of operation.

Moreover, it will be appreciated by those skilled in the art that the teachings of the present invention are not necessarily confined to the preferred embodiment (of the gear case, retaining member, and gear case cover) illustrated and described herein, but rather, are equally applicable to a wide variety of retaining members and internal housing components (and their method of assembly) in power tools and similar devices.

Obviously, many modifications may be made without departing from the basic spirit of the present invention. Accordingly, it will be appreciated by those skilled in the art that within the scope of the appended claims, the invention may be practiced other than has been specifically described herein.

I claim:

1. In a portable power tool, the combination of a metal gear case and a gear case cover, the gear case and gear case cover both being generally cylindrically shaped and axially disposed with respect to each other, a molded-plastic retaining member comprising a partially-formed ring mounted within the gear case, the ring having a plurality of circumferentially-spaced bosses formed integrally thereon, pins projecting radially from the respective bosses, the gear case having a wall with respective openings formed therein for receiving the pins, thereby keying the retaining ring to the gear case, fastening means passing axially through the gear case cover and received in openings formed in the respective bosses, thereby securing the gear case cover to the retaining ring and hence to the gear case, the gear case cover having an internal hub, locating ribs formed on the respective bosses on the retaining ring and radially engaging the hub on the gear case cover, thereby preventing the pins from pulling out of the respective openings in the gear case as the gear case cover is secured to the retaining ring, the internal hub of the gear case cover having a bearing boss formed therein, a bearing in the bearing boss, an output spindle in the gear case and having a rear portion journaled in the bearing, and an outer housing enclosing the gear case and gear case cover and having a portion thereof secured to the gear case cover.

2. A power tool, comprising a first housing member defining a housing opening having a predetermined breadth, a gear having a predetermined radius and being rotatably mounted in said first housing member about an axis and opposite said first housing member opening, a deformable resilient retaining member within said first housing member and having a keying means for connecting the retaining member to the first housing member opposite said gear upon deformation of said retaining member, a second housing member adjacent said housing opening, and fastening means for securing the second housing member to the retaining member, the fastening means including a fastener engageable with said retaining member.

3. The combination claimed in claim 2, wherein the first housing member having a one-piece gear case including a cylindrical wall defining said first housing member opening, the cylindrical wall including a plurality of wall openings, the retaining member including a plurality of bosses, the keying means being formed on the bosses and engaging the wall openings, and said fastener engaging one of said bosses.

4. The combination claimed in claim 3, wherein the second housing member including a gear case cover, the gear case cover including a hub, the gear being further rotatably supported from said hub, and said retaining member being a semi-circular plastic ring intermediate said cylinder wall and said hub.

5. The combination claimed in claim 4, wherein said retaining member bosses being circumferentially spaced around said semicircular plastic ring, and said fastening means including a plurality of fasteners respectively connected to said bosses and being radially spaced from said gear axis a distance less than the radius of said gear.

6. The method of assembling a portion of a power tool or the like, comprising the steps of providing a first housing member having a wall defining a plurality of openings, providing a deformable retaining member, deforming the retaining member so that the retaining member is keyed to the wall openings, placing a second housing member adjacent the retaining member, and fastening the second housing member to the retaining member.

7. A retaining member for interconnecting housing members of a power tool, comprising a deformable partially formed ring member made of resilient material, a plurality of circumferentially spaced bosses integrally formed on the ring member, and a pin extending radially outwardly from each of the bosses.

8. The retaining member claimed in claim 7, wherein the ring member being formed of plastic and having a generally semi-circular shape, the ring member having two ends, a boss being formed at each end, each boss defining a boss opening, and a plurality of ribs being formed on the exterior of said bosses.

9. In a power tool, the method of assembling a first housing member having an opening of predetermined breadth to a second housing member, comprising the steps of providing a deformable retaining member having a breadth greater than that of the opening of the first housing member, deforming the retaining member to fit within the opening of the first housing member, inserting the retaining member in the opening, keying the retaining member to the first housing member, placing the second housing member upon the first housing member and adjacent the retaining member, and fastening the second housing member to the retaining member.

10. A housing arrangement for a power tool, comprising a one-piece first housing member having a housing opening of predetermined breadth, a second housing member engaging the first housing member adjacent said first housing member opening, a resilient retaining member having a breadth greater than that of the first housing member opening and being deformable to pass through the first housing member opening, the resilient retaining member including keying means for connecting the retaining member to said first housing member subsequent to said deformation of the resilient member, and fastening means for connecting the second housing member to the retaining member.

11. The combination claimed in claim 10, wherein the first housing member includes a generally cylindrical wall defining said housing opening and further defining a plurality of wall openings, and said keying means including a plurality of radially projecting pins projecting therefrom and engageable respectively with said wall openings.

12. The combination claimed in claim 11, wherein the retaining member including a plurality of circumferentially-spaced bosses, and said fastening means including a plurality of fasteners passing through said second housing member and respectively engaging said bosses, thereby securing the second housing member to the first housing member.

13. The combination claimed in claim 12, wherein the resilient retaining member being a partially-formed ring, and the pins being circumferentially spaced about the radial exterior of said partially formed ring.

14. The combination claimed in claim 13, wherein said pins being integral with and extending radially from said bosses.

15. The combination claimed in claim 14, further comprising locating means formed on said bosses and radially engaging the second housing member, for precluding the disengagement of the keying means as the fastening means secures the second housing member to the first housing member.

16. The combination claimed in claim 15, wherein the locating means include a plurality of ribs radially formed on said bosses, said ribs having a triangular cross-section, and said retaining member being formed of plastic.

* * * * *